Nov. 22, 1966          A. WEST          3,286,576
DEVICE FOR EXERCISING AND COORDINATING FACIAL AND RELATED
MUSCULATURE AND STRUCTURE
Filed May 17, 1965
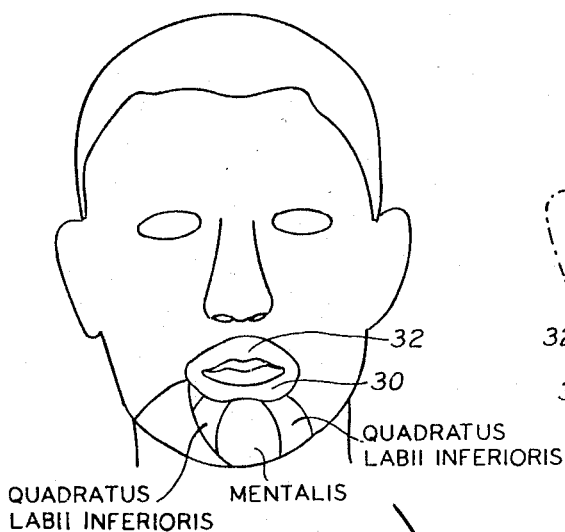
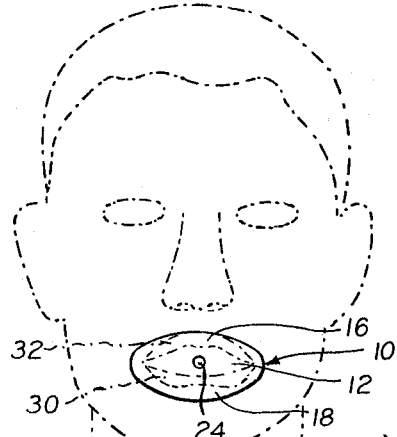
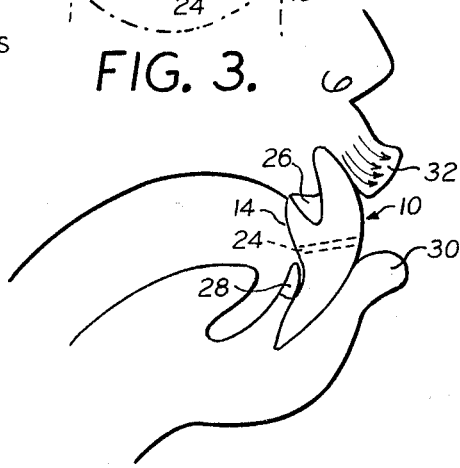
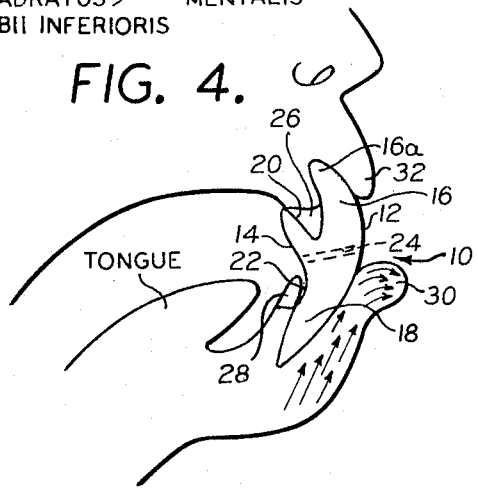
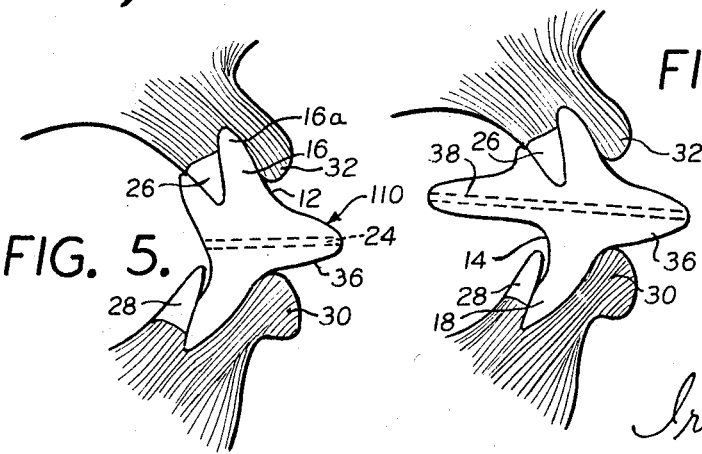
INVENTOR
ALVY WEST
BY
Irving Seidman
ATTORNEY.

United States Patent Office 3,286,576
Patented Nov. 22, 1966

3,286,576
DEVICE FOR EXERCISING AND COORDINATING FACIAL AND RELATED MUSCULATURE AND STRUCTURE
Alvy West, 39 Andover Road, Roslyn Heights, Long Island, N.Y.
Filed May 17, 1965, Ser. No. 456,394
11 Claims. (Cl. 84—466)

This invention relates generally to a device for exercising the lip muscles and more particularly to a device for coordinating related muscles of the embouchure in conjunction with the playing of all wind instruments or for use in speech therapy, singing or for forming the dental freeway space.

The mouthpiece of wind instruments such as a reed, a cup, etc., is usually supported by the lips and related musculature and structure of the person playing the particular instrument. Normally, a musician obtains sufficient strength and coordination in his lip muscles to support his instrument only after long periods of practice and playing. However, it has been found that in the majority of cases such periods of playing have produced bruising of the lips and in many instances has actually caused scar tissue to form about the lip. More specifically, when a tyro begins playing any wind instrument the lips are normally compressed between the mouthpiece of the instrument and the teeth. This action eventually causes bruising of the lips. When the student again attempts to play the instrument after, for example, a half-hour has elapsed, the swollen muscle fibers in the lips act as a cushion for the instrument and the player mistakenly believes this to be the development of the associated muscles. However, the constant pressure exerted against the swollen lips may eventually cause scar tissue to form. Such scar tissue will not be as supple as the lips per se and the playing of the instrument may seriously be hampered.

Accordingly, an object of the present invention is to provide a device for toning up, invigorating and coordinating related muscles of the embouchure.

It has been found that the use of the vestibule (the space between the lips and the teeth which terminates at the buccinators) as a resonance chamber produces the optimum results with respect to the richness of quality of the sound produced by the instrumentalist. However, the vestibule is rarely used or even understood by the student of wind instruments.

Another object of the present invention is to provide a device which, when inserted into the mouth identifies the two areas: the vestibule and the mouth proper.

Still another object of the present invention is to provide a device wherein the muscles associated with the lips are naturally formed and exercised in their functional positions as they would be when playing wind instruments.

A further object of the present invention is to provide a device which will exercise, coordinate and develop the musculature and structure associated with the lips to maintain the vestibule area when a person is playing any wind instrument.

In the fields of playing wind instruments, singing or in the field of speech therapy, it is imperative that the student exercise proper breathing habits. Accordingly, a still further object of the present invention is to provide a device which demonstrates how variations in the air stream may be achieved through the use of related internal structures (tongue, cheeks, teeth, muscles, etc.).

Another feature of the present invention is to provide a device which is received within the mouth and which provides the tongue with an added tactile point of reference so that the tongue can be manipulated into different variations and positions in accordance with instructions from a teacher.

In the field of dentistry it sometimes becomes vital for a person to form the so-called freeway space. With the oral cavity in this position the antagonistic muscles are in a state of balanced tension. That is, there is a balance between the muscles that raise the jaw and the muscles that lower the jaw.

Accordingly, another object of the present invention is to provide a device which fits within the mouth and which causes the related structure to form the freeway space.

Additional objects and advantages of the present invention will become more apparent from a consideration of the following detailed description when taken in conjunction with the accompanying drawings, in which:

FIG. 1 illustrates some of the muscles which are adapted to be exercised and coordinated by the device of the present invention;

FIG. 2 is a front view of a first embodiment of a mouth exerciser constructed according to the present invention;

FIGS. 3 and 4 respectively illustrate the application of the device of the present invention for exercising and coordinating the upper and lower lip and related muscles;

FIG. 5 illustrates a second embodiment of a mouth exerciser constructed according to the present invention; and FIG. 6 illustrates a third embodiment of a mouth exerciser constructed according to the present invention.

While the present invention as described below relates primarily to a device for exercising the lip muscles in conjunction with the playing of wind instruments, it is to be noted that this description is by way of illustration only and is not to be interpreted as limiting the uses of the present invention. That is, the device of the present invention may also be utilized in various fields such as speech therapy and teaching singing, as will become apparent from the following discussion.

A first embodiment of the device of the present invention is illustrated in FIGS. 2, 3 and 4 and comprises a member, designated generally by the numeral 10, which is adapted to fit within the mouth. The member 10 includes a generally convex front surface 12 and a generally concave rear surface 14. The upper portion 16 of the member 10 is relatively thick and tapers downwardly to a relatively thin lower portion 18. The rear surface 14 terminates below the front surface 12 and defines a wall 16a which projects above the top edge of the rear surface. Provided in the top portion 16 is a groove 20 which extends downwardly from the top edge of the rear surface 14. An approximately centrally located recess 22 is provided in the rear surface 14 of the member. The member 10 is also provided with a through bore 24 which extends downwardly rearwardly from the front surface of the member.

When it is to be used the device is placed in the mouth with the upper front teeth 26 in the groove 20 and the lower portion 18 between the lower front teeth 28 and the lower lip 30. (It is to be noted that portions of the device of the present invention extend beyond the teeth, between the gums and the lips. Thus, it is to be understood that when it is stated that the device is received between the teeth and the lips, that portions of the member 10 are also received between the associated gums and the lips.) The wall 16a is received between the upper lip 32 and the teeth 26. The device may be sized so that the lower edge of the member 10 will abut the bottom wall of the chamber defined by the lower lip 30 and the gums supporting the lower teeth 28 to maintain the upper teeth 26 spaced from the lower teeth 28, with the lower teeth 28 spaced rearwardly of the upper teeth 26. In this manner, it is impossible for the member 10 to be clenched between the teeth. Alternatively, the device may be sized so that the lower edge of the device 10 will terminate above the bottom wall of the chamber defined by the lower lip 30 and the gums supporting the lower teeth 28. However, the lower teeth 28 will still be spaced rearwardly of the upper teeth thereby forming the freeway space. Additionally, the recess 22 is positioned adjacent the upper edge of the lower teeth 28 so that a clearance will exist between the member 10 and the lower teeth.

In the preferred embodiment, the groove 20 may be filled with a thermosetting plastic material so that the device may be custom molded to the mouth of the specific user. More specifically, the plastic filling the groove 20 is the type which softens when placed in hot water. Thus, the user places the member 10 in hot water and then places the member in his mouth and bites down so that the upper teeth create the exact mold in the softened groove. The user then removes the device and drops it into cold water thus hardening the plastic lining and providing a mold which exactly fits the bite of the user.

When the device is utilized to exercise the lips, the user or student attempts to bite the device. Since the member 10 cannot be clenched between the teeth, the lower lip 30 will ride upwardly and outwardly on the front surface 12 of the member 10 (FIG. 4). (Alternatively, the lip 30 may be pushed upwardly and outwardly.) For this action, the following muscles will be exercised: the mentalis and the right and left quadratus labii inferioris (FIG. 1). The uper lip 32 will evert as shown in FIGS. 3 and 4. The eversion of the lips is maintained under tension until the muscles blanch, at which time they are relaxed. This exercise is repeated until the muscles are strengthened and coordinated to the extent whereby the lips and the associated musculature may support any wind instrument.

Accordingly, a device has been provided for strengthening the lip muscles without the attendant bruising or crushing of the lips as heretofore encountered by a student learning to play any wind instrument.

It is to be emphasized that the greatest benefit to be obtained from the aforementioned exercise can occur only when there is a balance between the pull of the muscles that raise and close the jaw. That is, when the freeway space is formed in the mouth. While this particular balance is obtained with the present invention, it is to be noted that such a balance could not be obtained if the member 10 were actually clenched or clamped between the teeth.

Additionally, it is to be noted that the member 10 occupies the vestibule space (the space between the lips and the teeth which terminates at the buccinators). Thus, the student is actually made to feel this cavity and, through proper muscle exercising, can be made to maintain this space when playing any wind instrument to provide an extra resonance cavity which enhances the quality of the sound reproduction when the student plays an instrument.

The device of the present invention is preferably fabricated from a plastic material. Accordingly, the lower portion 18 of the device may be trimmed to bring the upper and lower teeth (incisors) together to approximate the size of the musical instrument mouthpiece whether the mouthpiece is actually received in the mouth or on the lips. Thus, the device can be individually adapted to exercise the lips for any particular musical wind instrument mouthpiece.

As noted above, the device of the present invention is also adapted to teach the user proper breathing techniques when playing an instrument, singing or, in the field of speech therapy, when forming words. Accordingly, when the member 10 is inserted into the mouth and the user exhales, the air will pass through the bore 24. Thus by manipulating and coordinating the various portions of the mouth (tongue, cheeks, palate, teeth, etc.) different cavities can be formed with the tongue which will result in different air speeds and temperatures of the exiting air. Similarly, when inhaling, the speed of the air through the bore 24 and the temperature of the air will vary according to the internal structure of the mouth. The experienced teacher can immediately correct any defects in any one particular structure by noting the variations in the air stream. Additionally, the flow of air may be regulated through the bore 24 by inserting one of a series of tubes having different internal diameters which are sized to fit within the bore 24, to illustrate to the student how variations in the flow of the air affect the structure of the elements comprising the mouth. This will be particularly helpful in teaching a person to sing.

A second embodiment of the present invention is illustrated in FIG. 5 and is similar to the member 10 illustrated in FIGS. 3 and 4 with the exception that an integral forwardly extending projection 36 is provided on the front surface 12 of the member 10 which maintains the lips 30 and 32 in spaced relation to each other. The bore 24 extends through this projection. Thus, when the lips are exercised in the above mentioned manner, the lips, the right and left quadratus labii inferioris and the mentalis will be naturally formed and exercised and coordinated in their functional position as they would be if the mouthpiece of a wind instrument were actually inserted into or positioned against the mouth of the user.

A third embodiment of the present invention is illustrated in FIG. 6 and is similar to that shown in FIG. 5 with the exception that an integral rearwardly extending projection 38 is provided on the rear wall 14 of the member and is so positioned so that when the member 10 is positioned within the mouth, the projection 30 will be spaced above the top edge of the teeth 28, to prevent any clenching of the member between the teeth. The rear projection is particularly important in speech therapy and although one specific rear projection is shown it is to be understood that the projection 38 may be of any desired contour or shape. The rear projection is included to assist the palate and the tongue in tactile probings and the identification of existing space area in the mouth proper. The projection 38 also helps create additional sub-spaces in the mouth with the tongue. That is, the projection 38 forms a target for the tongue. The tongue is taught to assume a new position and is provided with contact points in the process of learning to find its particular target through a series of approximate probings. With the device in the position shown in FIG. 6, the tongue can assume a particular position once it naturally feels the proper position. Additionally, the device illustrated in FIG. 6 is similarly provided with a through bore 36 which is inclined rearwardly upwardly through the rearwardly extending projection 38.

Accordingly, a device has been provided for exercising and coordinating the lips and associated muscles in conjunction with the playing and supporting of any wind instrument mouthpiece, which is simple in construction and which produces a strengthening of the lip muscles without the attendant bruising or the producing of scar tissue. Additionally, the device may also be extremely useful in the field of speech therapy or as an aid in singing instruction.

While preferred embodiments have been described it will become apparent that numerous omissions, changes and additions may be made in such embodiments without departing from the scope or spirit of the persent invention.

What is claimed is:
1. A device for exercising and cordinating selected facial and related muscles comprising a member adapted to be received within the mouth, said member including an upper portion provided with a groove for receiving the upper teeth therein, and a lower portion sized to fit between the lower lip and the lower gums in spaced rela- tion to the upper edge of the lower teeth when the mouth is closed for positioning the lower front teeth rearwardly of the upper front teeth, said member being sized so that the bottom edge abuts the bottom wall of the chamber defined by the lower lip and the lower teeth to space the upper and lower teeth apart.

2. A device for exercising selected facial muscles as in claim 1, and spacing means connected to said member for maintaining the lips in spaced relation to each other.

3. A device for exercising selected facial muscles as in claim 2, wherein said spacing means comprises an integral forwardly extending projection on said member adapted to project between the lips when said member is received within the mouth.

4. A device for exercising selected facial muscles as in claim 3, and a through bore in said projection, said through bore providing a passage for the flow of air.

5. A device for exercising and coordinating facial and related muscles comprising a member having a front and a rear surface adapted to fit the mouth, said member including an upper portion provided with an upper teeth receiving groove, a lower portion adapted to fit between the lower lip and the lower teeth and abutting the bottom wall of the chamber formed therebetween, said lower portion being sized to position the lower front teeth rearwardly of the upper front teeth to prevent clenching of the member between the teeth, and a recess on the rear surface of the member positioned adjacent the upper portion of the lower teeth when the member is in the mouth and the mouth is closed, said recess being sized to provide a clearance between said member and the top surface of the lower teeth.

6. A device for exercising and coordinating facial and related muscles as in claim 5, and a forwardly extending projection on said member adapted to be recived between the lips.

7. A device for exerising and coordinating facial and related muscles as in claim 6, and an integral rearwardly extending projection on said member positioned to be spaced substantially above the lower teeth when the member is in the mouth and the mouth is closed.

8. A device as in claim 7, and a through bore in said member and said rearwardly and forwardly extending projections providing a passage for the flow of air.

9. A device as in claim 7, wherein the front surface of the member is convex and the rear surface of the member is concave.

10. A device according to claim 5, in which said recess extends over a substantial portion of the rear surface of said lower portion to provide a space between the lower teeth and said member to prevent the clenching of said member between the teeth when the mouth is closed.

11. A device as in claim 1, and a rearwardly extending projection on said member sized and positioned to be in spaced relation to the upper edge of the lower teeth when said member is received in the mouth and the mouth is closed.

References Cited by the Examiner

UNITED STATES PATENTS

| 291,071 | 1/1884 | Mitchell | 84—466 |
|---|---|---|---|
| 779,360 | 1/1905 | Grummann | 84—466 |
| 2,669,988 | 2/1954 | Carpenter | 128—136 |
| 2,678,043 | 5/1954 | Stark | 128—136 |
| 3,014,286 | 12/1961 | Hricak | 84—466 X |
| 3,126,002 | 3/1964 | Owens | 128—136 |
| 3,187,746 | 6/1965 | Gerber | 128—136 |

FOREIGN PATENTS 345,006   12/1921   Germany.

RICHARD B. WILKINSON, *Primary Examiner.*

LOUIS J. CAPOZI, *Examiner.*

C. M. OVERBEY, *Assistant Examiner.*